US012658819B2

(12) United States Patent
Tan

(10) Patent No.: US 12,658,819 B2
(45) Date of Patent: Jun. 16, 2026

(54) METHOD TO MAINTAIN SYNCHRONOUS RECTIFICATION AT LIGHT LOADS

(71) Applicant: STMICROELECTRONICS ASIA PACIFIC PTE LTD, Singapore (SG)

(72) Inventor: Kien Beng Tan, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 894 days.

(21) Appl. No.: 17/513,570

(22) Filed: Oct. 28, 2021

(65) Prior Publication Data

US 2023/0135356 A1 May 4, 2023

(51) Int. Cl.
| | | |
|---|---|---|
| *H02J 50/10* | (2016.01) |
| *H02J 7/00* | (2026.01) |
| *H02J 7/06* | (2006.01) |
| *H02J 7/90* | (2026.01) |
| *H02M 7/219* | (2006.01) |
| *H02M 1/00* | (2006.01) |

(52) U.S. Cl.
CPC .............. *H02M 7/219* (2013.01); *H02J 7/06* (2013.01); *H02J 7/933* (2026.01); *H02J 50/10* (2016.02); *H02M 1/0009* (2021.05)

(58) Field of Classification Search
CPC ...... H02M 7/219; H02M 1/0009; H02J 50/10; H02J 7/00712; H02J 7/06
See application file for complete search history.

(56) References Cited

U.S. PATENT DOCUMENTS

| | | | | |
|---|---|---|---|---|
| 3,803,471 | A | * | 4/1974 | Price ......................... H02P 7/29 388/811 |
| 6,271,712 | B1 | * | 8/2001 | Ball .................. H02M 3/33592 327/309 |
| 8,362,748 | B2 | | 1/2013 | Miyanaga et al. |
| 8,952,670 | B2 | | 2/2015 | Huang et al. |
| 9,577,546 | B2 | | 2/2017 | Teren et al. |
| 10,177,602 | B2 | * | 1/2019 | Akram .................... H01F 38/14 |
| 10,291,127 | B2 | * | 5/2019 | Akram .............. H02M 3/33592 |
| 2009/0261790 | A1 | * | 10/2009 | Arduini ............. H02M 3/33592 363/21.06 |
| 2015/0263534 | A1 | * | 9/2015 | Lee ........................ H02M 7/219 307/104 |

(Continued)

FOREIGN PATENT DOCUMENTS

| | | |
|---|---|---|
| CN | 104104228 B | 6/2017 |
| CN | 110492621 A | 11/2019 |

(Continued)

OTHER PUBLICATIONS

Electronics Tutorials "Op-amp Comparator" https://www.electronics-tutorials.ws/opamp/op-amp-comparator.html (Year: 2020).*

(Continued)

*Primary Examiner* — Drew A Dunn
*Assistant Examiner* — Pamela J Jeppson
(74) *Attorney, Agent, or Firm* — Seed Intellectual Property Law Group LLP

(57) ABSTRACT

An electronic device includes a synchronous rectifier and a battery. The synchronous rectifier outputs a charging current to the battery. The electronic device includes rectifier controller that adjusts a resistance of a switch of the rectifier based on a magnitude of the charging current.

22 Claims, 4 Drawing Sheets

(56)                    References Cited

U.S. PATENT DOCUMENTS

2016/0043562 A1 *    2/2016  Lisi ........................ H02J 50/12
                                                          307/104
2022/0109375 A1     4/2022  Iorio et al.

FOREIGN PATENT DOCUMENTS

EP          1608066  A1    12/2005
EP          3270487  A1     1/2018
JP        2010161855  A  *  7/2010

OTHER PUBLICATIONS

Machine translation of JP2010161855A. (Year: 2010).*

* cited by examiner

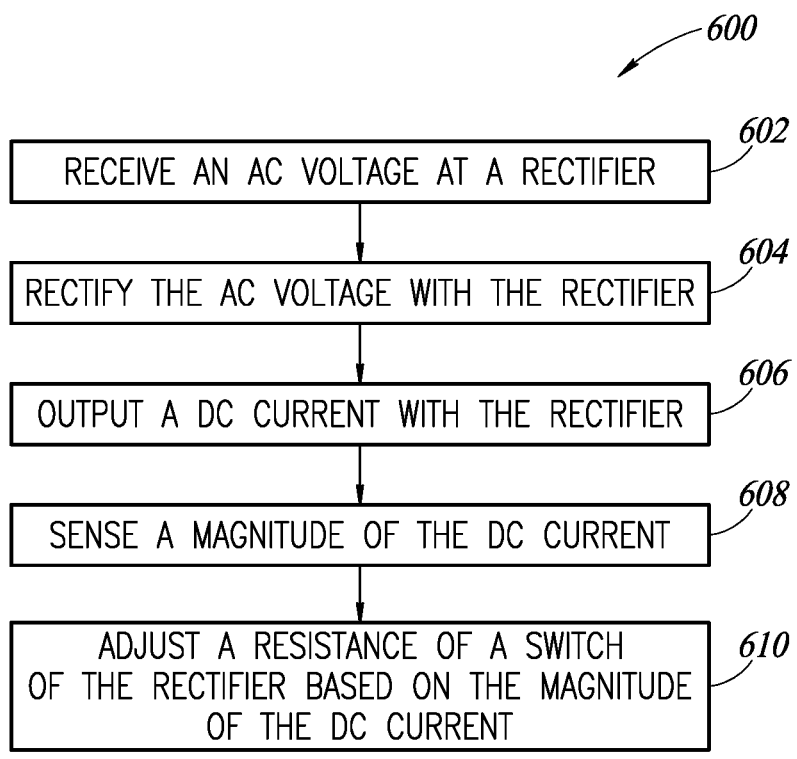

*600*

*602*

RECEIVE AN AC VOLTAGE AT A RECTIFIER

*604*

RECTIFY THE AC VOLTAGE WITH THE RECTIFIER

*606*

OUTPUT A DC CURRENT WITH THE RECTIFIER

*608*

SENSE A MAGNITUDE OF THE DC CURRENT

*610*

ADJUST A RESISTANCE OF A SWITCH OF THE RECTIFIER BASED ON THE MAGNITUDE OF THE DC CURRENT

FIG. 6

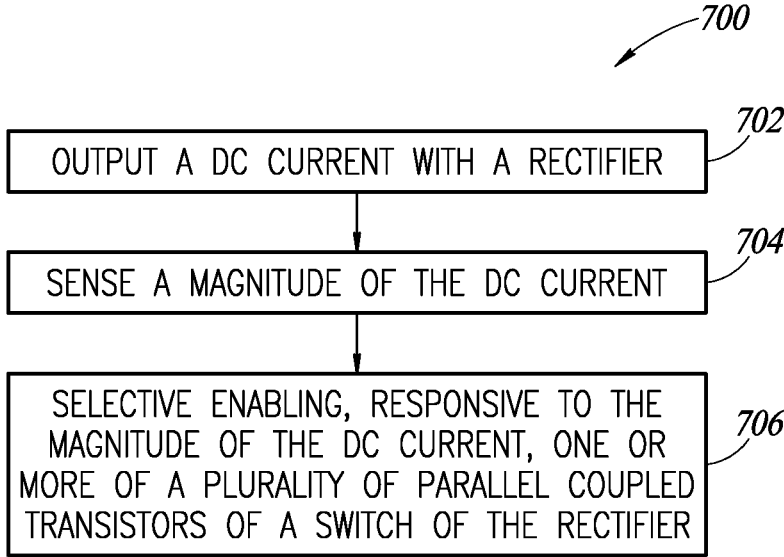

*700*

*702*

OUTPUT A DC CURRENT WITH A RECTIFIER

*704*

SENSE A MAGNITUDE OF THE DC CURRENT

*706*

SELECTIVE ENABLING, RESPONSIVE TO THE MAGNITUDE OF THE DC CURRENT, ONE OR MORE OF A PLURALITY OF PARALLEL COUPLED TRANSISTORS OF A SWITCH OF THE RECTIFIER

FIG. 7

METHOD TO MAINTAIN SYNCHRONOUS RECTIFICATION AT LIGHT LOADS

BACKGROUND

Technical Field

The present disclosure is related to integrated circuits, and more particularly to integrated circuits including rectifiers.

Description of the Related Art

Many electronic devices, such as mobile phones and watches, include a battery. The batteries occasionally need to be recharged. In many cases, this can be accomplished by connecting the electronic device to a power outlet via charging cord. However, in some cases batteries can be charged wirelessly via inductive charging. The electronic device is placed adjacently to a wireless charging device that emits a charging field. Energy harvesting circuitry within the electronic device harvests energy from the charging field.

The energy harvesting circuitry may include a rectifier that converts an AC voltage to a DC charging current. In some scenarios the rectifier may not function properly and may generate excess amounts of heat. These excess amounts of heat can result in the temperature of the electronic device increasing to undesired levels.

BRIEF SUMMARY

Embodiments of the present disclosure provide an electronic device having a synchronous rectifier circuit for outputting a DC charging current to a battery of the electronic device. The synchronous rectifier circuit includes a plurality of switches that can are selectively turned on or off in order to supply the DC charging current. At least one of the switches is a variable switch having an on-resistance that can be selectively adjusted. The rectifier circuit selectively adjusts the on-resistance of the variable switch based on the magnitude of the DC charging current. This helps ensure that power dissipation and temperature changes from the rectifier remain low.

In one embodiment, the variable switch includes a plurality of transistors connected in parallel. Each of the transistors has a control gate coupled to a rectifier controller of the electronic device. The rectifier controller can selectively enable or disable each of the transistors by connecting or disconnecting the control gates to a voltage source. The resistance of the switch is increased by disconnecting more of the transistors. The resistance of the switch is decreased by connecting more of the transistors.

In one embodiment, the electronic device includes a current sensor. The current sensor senses the magnitude of the DC charging current and outputs a sensor signal to the rectifier controller. The sensor signal indicates the magnitude of the DC charging current. The rectifier controller adjusts the resistance of the variable switch based on the magnitude of the DC charging current.

BRIEF DESCRIPTION OF THE SEVERAL VIEWS OF THE DRAWINGS

FIG. 6 is a flow diagram of a method for operating a rectifier, in accordance with one embodiment.

FIG. 7 is a flow diagram of a process for operating a rectifier, in accordance with one embodiment.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
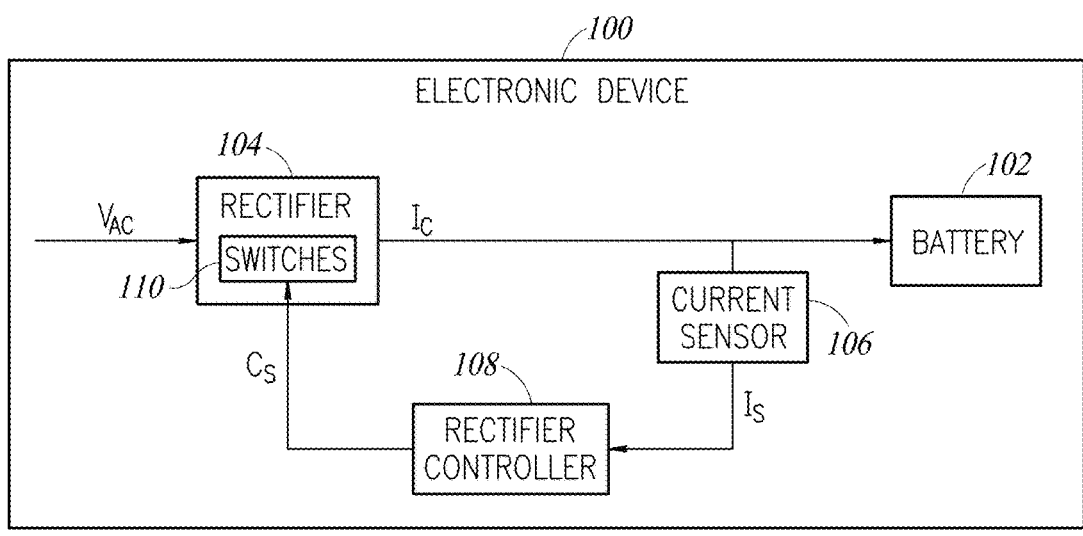
FIG. 1 is a block diagram of an integrated circuit, in accordance with one embodiment.

FIG. 1 is a block diagram of an electronic device 100, in accordance with one embodiment. The electronic device 100 includes a load 102, a rectifier 104, a current sensor 106, and a rectifier controller 108. As will be set forth in more detail below, the components of the electronic device 100 cooperate to provide a DC current to the load 102 while promoting low power dissipation and temperature changes.

The load 102 may include a battery. In this case, the DC current may be a DC charging current for charging the battery. Alternatively, the load may include another type of device or circuit. In one embodiment, the load 102 is positioned between the rectifier 104 and a battery.

The electronic device 100 can include a mobile phone, a smartwatch, wireless headphones, smart glasses, a tablet, a laptop, or other types of electronic devices. The electronic device may be configured for wireless charging of the battery. In a wireless charging situation, the electronic device 100 is placed on a wireless charging device such that inductive circuitry of the electronic device 100 is inductively coupled to charging circuitry of the wireless charging device. The wireless charging device outputs a charging field. The electronic device 100 generates an AC voltage $V_{AC}$ from the charging field. While examples herein may refer to a situation in which the electronic device generates an AC voltage from a wireless charging device, principles of the present disclosure 100 extend to AC voltages generated by wired connections or in other ways.

The electronic device 100 includes a rectifier 104. The rectifier 104 receives the AC voltage $V_{AC}$ and outputs a charging current I to the load 102. In practice, the rectifier 104 generates a DC voltage by rectifying the AC voltage $V_{AC}$. The load 102 draws the DC charging current I from the DC voltage generated by the rectifier 104. Further details regarding the rectifier 104 and the charging current I will be set forth further below.

The load 102 may include control circuitry that limits the magnitude of the I current drawn by the load 102. One reason for this can be to limit the amount of heat generated by charging a battery, in examples in which the load 102 is a battery or includes a battery. If too much heat is generated from charging the battery 102, the temperature of the electronic device 100 may become very high. If the temperature of the electronic device 100 becomes very high, then the electronic device 100 may become damaged or may not function properly. Additionally, a user of the electronic device 100 could endure discomfort if the temperature of the electronic devices to.

In one embodiment in which the load 102 includes a battery, the magnitude of the charging current I is based on the current total charge of the battery. When the battery holds a very low charge, i.e. is depleted, then the battery may allow a relatively high DC charging current I. As the charge of the battery 102 increases, the battery may gradually decrease the magnitude of the charging current. Accordingly, as the battery approaches a fully charged state, the magnitude of the DC charging current I may become significantly reduced. While this may be beneficial in protecting the battery or the electronic device 100, other difficulties may arise with the function of the rectifier 104 as the DC charging current I is decreased.

In one embodiment, the rectifier 104 operates as a synchronous rectifier. The rectifier 104 may include multiple switches 110 coupled between nodes of the AC voltage $V_{AC}$ and configured to rectify the AC voltage. The switches 110 are selectively enabled and disabled as the nodes of the AC voltage fluctuate in the periodic manner of a sinusoid or another form of AC voltage. The rectifier 104 may also include a plurality of diodes each coupled in parallel with one of the switches 110.

It is possible that as the charging current I reduces, the voltage drop across one or more of the switches 110 may reduce to the point that the switch 110 no longer turns on when the rectifier 104 tries to turn on the switch 110 in the process of synchronous rectification. If this happens, then a substantial portion of the charging current may flow through the corresponding diode of the rectifier 104. When the charging current flows through the diode, the voltage drop across the diode may be significantly higher than the desired voltage drop across the switch 110. This can result in a very large amount of power dissipation across the diode. The large amount of power dissipation across the diode can cause a large increase in temperature of the electronic device 100.

The electronic device 100 overcomes these potential problems by utilizing the current sensor 106, the rectifier controller 108, and by including at least one variable switch among the switches 110. The variable switch 110 may have a variable resistance that can be selectively increased or decreased to ensure a desired voltage drop across the variable switch 110 as the DC charging current I changes.

The current sensor 106 is coupled between the rectifier 104 and the battery 102. The current sensor 106 senses the magnitude of the DC charging current I. The current sensor 106 generates a sensor signal $I_s$. The sensor signal $I_s$ is indicative of the magnitude of the DC charging current I. The current sensor 106 passes the sensor signal $I_s$ to the rectifier controller 108.

The rectifier controller 108 is coupled to the current sensor 106 and receives the sensor signal $I_s$ from the current sensor 106. The rectifier controller 108 is also coupled to the rectifier 104. More particularly, the rectifier controller 108 is coupled to the variable switch of the switches 110 of the rectifier 104. The rectifier controller 108 adjusts the resistance of the switch 110 based on the magnitude of the DC charging current I.

In one embodiment, as the magnitude of the charging current I decreases, the rectifier controller 108 increases the magnitude of the resistance of the variable switch of the switches 110. Because the voltage drop across the variable switch is based on Ohm's law V=I*R, increasing the resistance of the variable switch can increase the voltage drop across the variable switch. This can ensure that the variable switch will turn on when desired.

In one embodiment, the switches 110 are transistors. The voltage drop across the switches 110 corresponds to the voltage drop between the drain and source terminals of the transistors. The voltage $V_S$ at the source terminal of the transistor is equal to $V_D$–I*R, where $V_D$ is the voltage at the drain terminal, R is the resistance of the transistor, and I is a current flowing between the drain and source of the transistor. The transistor turns on when the $V_G$-$V_S$ ($V_{GS}$) is greater than the threshold voltage $V_{TH}$ of the transistor. However, if the voltage drop from the drain terminal to the source terminal was low, then $V_S$ will not be sufficiently low to turn on the transistor. This will result in much of the current flowing through the diode, as described above.

In one embodiment, the variable switch includes a plurality of transistors coupled in parallel. The parallel coupling means that the drain terminals of each of the transistors are connected together and that the source terminals of each of the transistors are connected together. The resistance of the switch is adjusted by selectively controlling the number of transistors whose gate terminals can receive a gate turn-on voltage. The rectifier controller 108 determines which of the parallel transistors will receive the gate turn-on voltage. When more transistors receive the gate turn-on voltage, the resistance of the switch is reduced. When fewer of the transistors receive the gate turn-on voltage, the resistance of the switch is increased. Accordingly, the rectifier controller 108 can control the resistance of the switch by controlling the number of parallel transistors that receive the gate turn-on voltage. This may also correspond to controlling the size of the switch by controlling the number of transistors that are enabled at any given time.

In one example, battery may initially be substantially depleted. The electronic device 100 is placed in close proximity to a wireless charging device. The electronic device 100 generates the AC voltage $V_{AC}$ from the wireless charging device via inductive coupling. The battery initially draws a relatively high DC charging current I. Because the DC charging current I is high, the rectifier controller 108 reduces the resistance of a variable switch by enabling all of the parallel transistors of the switch. As the level of charge of the battery gradually increases, the battery draws a smaller DC charging current I. The current sensor 106 senses the reduced charging current I and provides the sensor signal $I_s$ to the rectifier controller 108. The rectifier controller disables one or more of the transistors of the variable switch, thereby effectively increasing the resistance of the switch in ensuring that the switch can continue to be turned on and off reliably. As the battery nears a full charge, the DC charging current I may be very small. The rectifier controller may only enable a single transistor of the variable switch, thereby increasing the resistance of the switch to the maximum in ensuring that the switch can turn on and off properly even at the low value of the DC charging current I.

Figure 2:
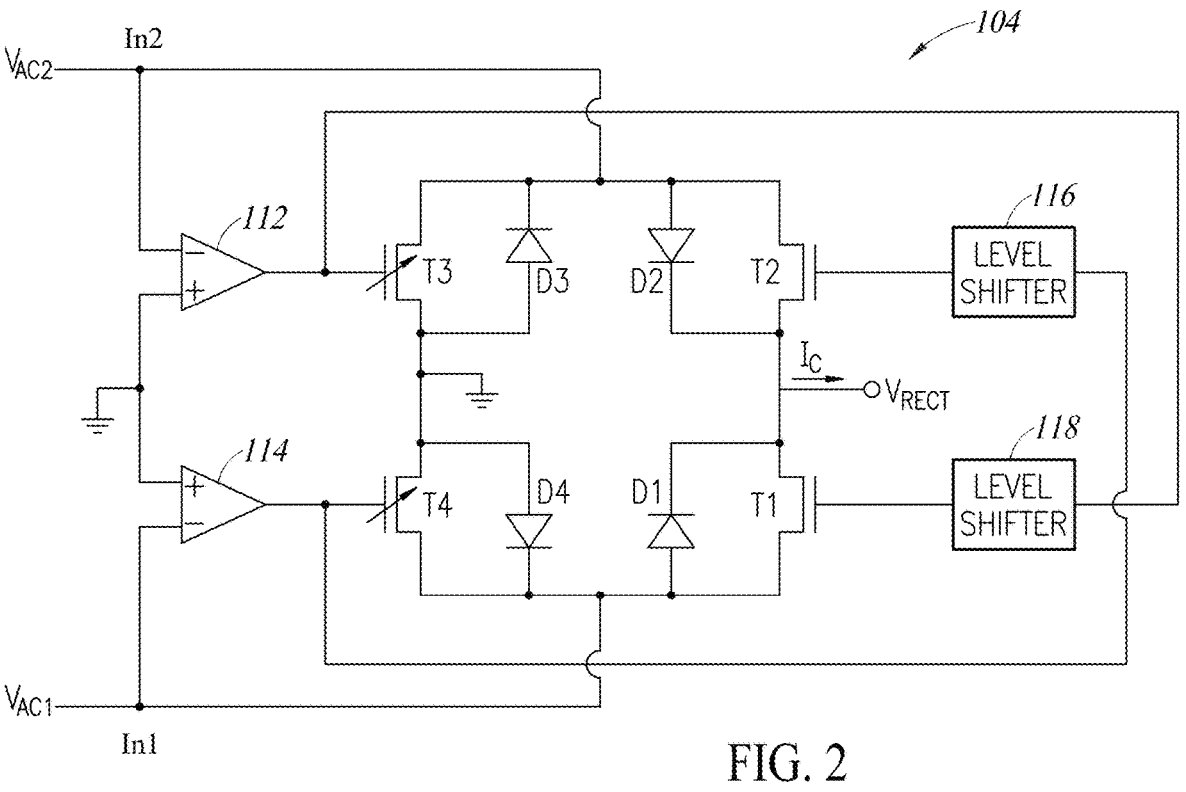
FIG. 2 is a block diagram of a synchronous rectifier of an electronic device, in accordance with one embodiment.

FIG. 2 is a schematic diagram of a rectifier 104, in accordance with one embodiment. The rectifier 104 of FIG. 2 is one example of the rectifier 104 of FIG. 1. The rectifier 104 includes a first input node In1 that receives a first AC input voltage $V_{AC1}$. The rectifier 104 includes a second input node In2 that receives a second AC input voltage $V_{AC2}$. $V_{AC2}$–$V_{AC1}$ corresponds to the AC voltage $V_{AC}$. The rectifier 104 generates a rectified DC voltage $V_{RECT}$ and outputs a DC charging current I.

The rectifier 104 includes a first transistor $T_1$, the second transistor $T_2$, a third transistor $T_3$, and a fourth transistor $T_4$. The drain terminal of the transistor $T_1$ is connected to the first input node and receives the voltage $V_{AC1}$. The source terminal of the transistor $T_1$ is coupled to the output node of the rectifier 104. The output node applies the rectified voltage $V_{RECT}$ and the DC charging current I. The drain terminal of the transistor $T_2$ is coupled to the second input node and receives the input voltage $V_{AC2}$. The source terminal of the transistor $T_2$ is coupled to the output terminal of the rectifier 104.

The drain terminal of the transistor $T_3$ is coupled to the second input terminal and receives the second input voltage $V_{AC2}$. The source terminal of the transistor $T_3$ is coupled to ground. The drain terminal of the transistor $T_4$ is coupled to the first input terminal and receives the voltage $V_{AC1}$. The source terminal of the transistor $T_4$ is coupled to ground.

The rectifier 104 includes four diodes $D_1$-$D_4$. Each diode is coupled in parallel with a respective one of the transistors $T_1$-$T_4$. The anode of the diode $D_1$ is coupled to $V_{AC1}$. The cathode of the diode $D_1$ is coupled to the output terminal of the rectifier 104. The anode of the diode $D_2$ is connected to $V_{AC2}$. The cathode of the diode $D_2$ is connected to the output terminal of the rectifier 104. The anode of the diode $D_3$ is coupled to ground. The anode of the diode $D_4$ is coupled to ground. The cathode of the diode $D_4$ is coupled to $V_{AC1}$.

The rectifier 104 includes a comparator 112. The output terminal of the comparator 112 is coupled to the gate terminal of the transistor $T_3$. The inverting input of the comparator 112 is coupled to $V_{AC2}$. The noninverting input of the comparator 112 is coupled to ground.

The rectifier 104 includes a comparator 114. The output of the comparator 114 is coupled to the gate terminal of the transistor $T_4$. The inverting input of the comparator 114 is coupled to $V_{AC}$ i. The noninverting input of the comparator 114 is coupled to ground.

The rectifier 104 includes a level shifter 116. The level shifter 116 is coupled between the gate terminal of the transistor $T_2$ and the output of the comparator 114. When the output of the comparator 114 is low, the level shifter 116 supplies a low-voltage to the gate terminal of the transistor $T_2$. When the output of the comparator 114 is high, the level shifter 116 boosts the high voltage of the comparator 114 to an even higher boosted voltage value. The utility of this will be described further below.

The rectifier 104 includes a level shifter 118. The level shifter 118 is coupled between the gate terminal of the transistor $T_1$ and the output of the comparator 112. When the output of the comparator 112 is low, the level shifter 118 supplies a low-voltage to the gate terminal of the transistor $T_1$. When the output of the comparator 112 is high, the level shifter 118 boosts the high voltage of the comparator 112 to an even higher boosted voltage value. The utility of this will be described further below.

The rectifier 114 is a synchronous rectifier that operates in a synchronous mode. In the synchronous mode, the transistors $T_1$-$T_4$ are turned on and off in such a manner that all current flows primarily through the transistors $T_1$-$T_4$ rather than through the diodes $D_1$-$D_4$. The transistors $T_1$ and $T_3$ are controlled by the comparator 112. When the output of the comparator 112 is low, the transistor $T_3$ is turned off. When the output of the comparator 112 is high, the transistor $T_3$ is turned on. The transistors $T_2$ and $T_4$ are controlled by the output of the comparator 114. When the output of the comparator 114 is low, the transistors $T_2$ and $T_4$ are turned off. When the output of the comparator 114 is high, the transistors $T_2$ and $T_4$ are turned on.

Figure 3:
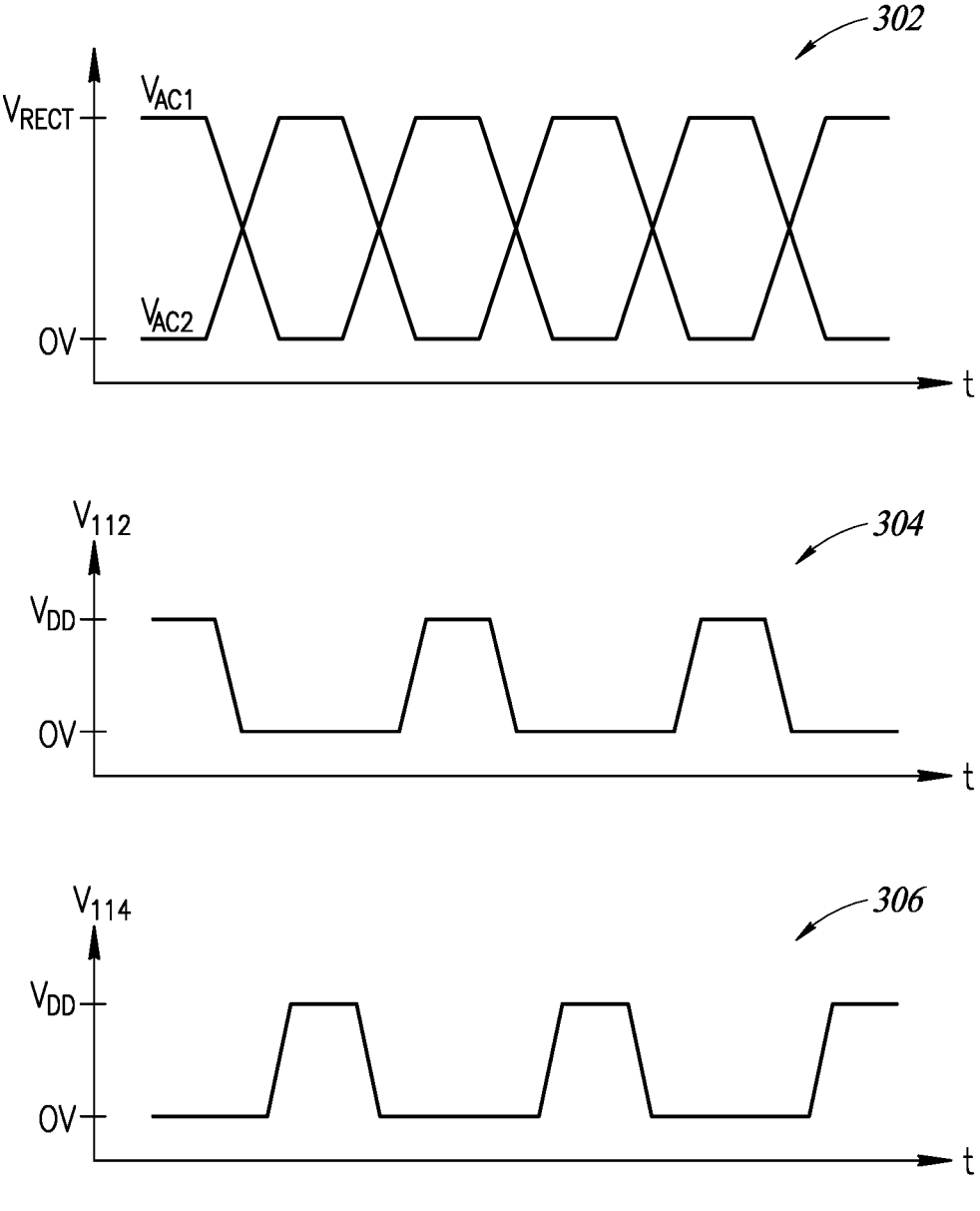
FIG. 3 includes graphs representing signals associated with a synchronous rectifier, in accordance with one embodiment.

Further description of the operation of the rectifier 104 will be made with reference to FIG. 3. FIG. 3 includes graphs illustrating the values of signals associated with the rectifier 104 of FIG. 2, in accordance with one embodiment. The graph 302 illustrates the voltages $V_{AC1}$ and $V_{AC2}$. As can be seen in FIG. 3, $V_{AC1}$ and $V_{AC2}$ alternate between high and low values. In practice, the AC voltages $V_{AC1}$ and $V_{AC2}$ may have other forms than shown in the graph 302. For example, $V_{AC1}$ and $V_{AC2}$ may be substantially sinusoidal in one embodiment. The graph 302 also illustrates the rectified voltage $V_{RECT}$. While the graph 302 illustrates the rectified voltage $V_{RECT}$ having approximately the same value as the positive amplitudes of $V_{AC1}$ and $V_{AC2}$, in practice, $V_{RECT}$ may be slightly lower than the positive amplitudes of $V_{AC1}$ and $V_{AC2}$.

The graph 304 illustrates the output voltage $V_{112}$ of the comparator 112. The output voltage $V_{112}$ of the comparator 112 is high when $V_{AC1}$ is greater than the rectified voltage $V_{RECT}$ and $V_{AC2}$ is less than 0 V. Otherwise, the output voltage $V_{112}$ of the comparator 112 is low. Accordingly, the transistors $T_1$ and $T_3$ are on when $V_{AC1}$ is greater than the rectified voltage $V_{RECT}$ and $V_{AC2}$ is less than 0 V, otherwise the transistors $T_1$ and $T_3$ are off.

The graph 306 illustrates the output voltage $V_{114}$ of the comparator 114. The output voltage $V_{114}$ of the comparator 114 is high when $V_{AC2}$ is greater than the rectified voltage $V_{RECT}$ and $V_{AC1}$ is less than 0 V. Otherwise, the output voltage $V_{114}$ of the comparator 114 is low. Accordingly, the transistors $T_2$ and $T_4$ are on when $V_{AC2}$ is greater than the rectified voltage $V_{RECT}$ and $V_{AC1}$ is less than 0 V, otherwise the transistors $T_2$ and $T_4$ are off.

Returning to FIG. 2, as described in relation to FIG. 1, the current level charge of the battery 102 determines the magnitude of the charging current I. When the battery 102 is at a low level of charge, the charging current I may be relatively high. When the battery 102 approaches full charge, the charging current I may be relatively low. The voltage drop between the source and drain terminals of the transistors $T_1$-$T_4$ is based on the magnitude of the current flowing through the transistors $T_1$-$T_4$ and the on-resistances of the transistors $T_1$-$T_4$.

As described previously in relation to FIG. 1, if the charging current I flowing through the transistors $T_1$-$T_4$ is very small, such as when the battery 102 is approaching full charge, the voltage drops across the transistors $T_3$ and $T_4$ may not be sufficiently large to ensure a high enough gate to source voltage $V_{GS}$ to ensure that the transistors $T_3$ and $T_4$ turn on, even when the outputs of the comparators 112 and 114 go high.

To address this issue, the rectifier 104 utilizes variable resistance transistors for the transistors $T_3$ and $T_4$. As the charging current I decreases, the rectifier controller 108 increases the resistance of the transistors $T_3$ and $T_4$ to provide a sufficiently large voltage drop between the drain and source terminals to ensure that the source voltages will be low enough that the transistors $T_3$ and $T_4$ will turn on when the comparators 112 and 114 go high.

The rectifier controller 108 controls the resistances of the transistors $T_3$ and $T_4$ to be relatively low when the charging current I is relatively large. This can help avoid unduly large power dissipations at the transistors $T_3$ and $T_4$ when the charging current I is high. Further details regarding the variable transistors $T_3$ and $T_4$ are provided in relation to FIG. 4.

In one embodiment, the transistors $T_1$ and $T_2$ are not variable resistance transistors. Instead, the level shifters 116 ensures that the transistor $T_2$ will turn on when the output of the comparator 114 is high, even if there is a small charging current I and a correspondingly low voltage drop across the transistor $T_2$. The level shifter 116 shifts the high-voltage output from the comparator 114 to a high enough level to ensure that the gate to source voltage $V_{GS}$ of the transistor $T_2$ is sufficient to turn on the transistor $T_2$ regardless of the magnitude of the charging current I. The level shifter 118 shift the high-voltage output from the comparator 112 to a high enough level to ensure that the gate to source voltage $V_G$ a sum of the transistor $T_1$ is sufficient to turn on the transistor $T_1$ regardless of the magnitude of the charging current I.

In one embodiment, the high voltage VDD output by the comparator 112 is between 3 V and 10 V. The level shifter 116 boosts the high-voltage by a value between 8 V and 20 V. In an example in which VDD is 3 V and the level shifter boost the high-voltage by 8 V, then when the output of the comparator 114 goes high, the level shifter 116 supplies 11 V the gate terminal of the transistor $T_2$. Other voltages for VDD and for the boost provided by the level shifter 116 can be utilized without departing from the scope of the present disclosure.

Figure 4:
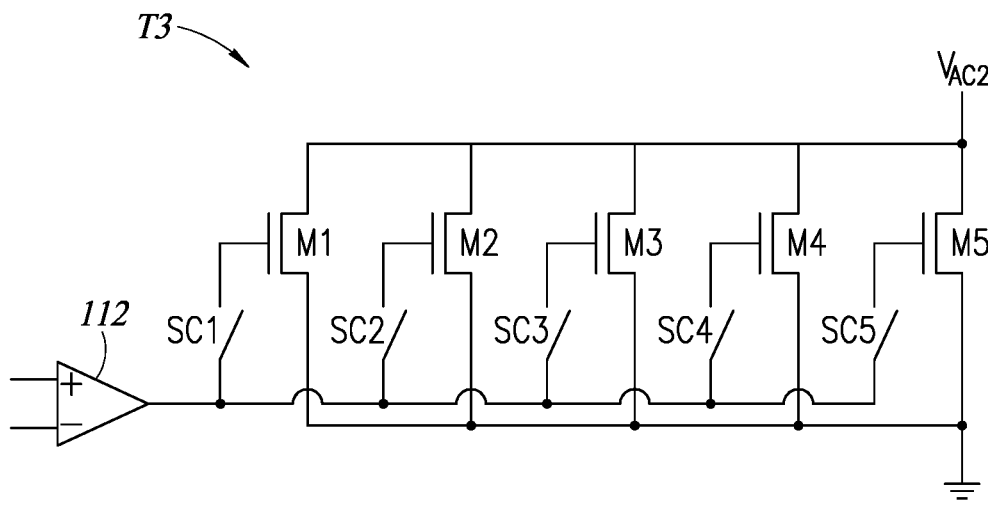
FIG. 4 is a schematic diagram of a variable switch of a synchronous rectifier, in accordance with one embodiment.

FIG. 4 is a schematic diagram of the variable transistor $T_3$ of FIG. 2, in accordance with one embodiment. The variable transistor $T_3$ includes a plurality of transistors $M_1$-$M_5$ coupled in parallel with each other. In particular, the drain terminals of the transistors $M_1$-$M_5$ are all coupled to $V_{AC2}$. The source terminals of the transistors $M_1$-$M_5$ are all coupled to ground. The gate terminals of the transistors $M_1$-$M_5$ can be selectively coupled or decouple from the output of the comparator 112 by operation of a respective control switches $S_{C1}$-$S_{C5}$.

The total resistance of the transistor $T_3$ is based on the number of the transistors $M_1$-$M_5$ that are enabled by the rectifier controller 108. The rectifier controller 108 can reduce the resistance of the transistor $T_3$ by enabling more of the transistors $M_1$-$M_5$. The rectifier controller can increase the resistance of the transistor $T_3$ by enabling fewer of the transistors $M_1$-$M_5$.

The rectifier controller 108 (see FIG. 1) controls the operation of the control switches $S_{C1}$-$S_{C5}$ responsive to the magnitude of the charging current I as sensed by the current sensor 106. The rectifier controller 108 enables or disables any of the transistors $M_1$-$M_5$ by closing or opening the corresponding control switches $S_{C1}$-$S_{C5}$. For example, if the magnitude of the charging current I is such that the rectifier controller 108 determines that the transistors $M_1$ and $M_2$ should be enabled while the transistors $M_3$-$M_5$ should be disabled, then the rectifier controller 108 closes the control switches $S_{C1}$ and $S_{C2}$ and opens the control switches $S_{C3}$-$S_{C5}$. The result is that the gate terminals of the transistors $M_1$ and $M_2$ are coupled to the output of the comparator 112, while the gate terminals of the transistors $M_3$-$M_5$ are disconnected from the output of the comparator 112.

In one embodiment, each of the transistors $M_1$-$M_5$ have a same on-resistance. Accordingly, each of the transistors $M_1$-$M_5$ may have a same size. The size of the transistors $M_1$-$M_5$ corresponds to the width the length ratio W/L of the channel regions of the transistors $M_1$-$M_5$. If each of the transistors of the same with the length ratio W/L in the same general structures and doping profiles, then each of the transistors $M_1$-$M_5$ will have substantially the same on-resistance.

In one embodiment, the transistors $M_1$-$M_5$ on-resistances. This may mean that the transistors $M_1$-$M_5$ may have different widths the length ratios. The rectifier controller 108 can selectively enable one or more of the transistors $M_1$-$M_5$ in order to achieve a desired on-resistance.

While FIG. 4 illustrates an embodiment of the variable transistor $T_3$, the variable transistor $T_4$ may have substantially the same components as the variable transistor $T_3$, including one or more transistors that can be selectively enabled.

While the description describes adjusting the on-resistance of the variable transistors $T_3$ and $T_4$, as set forth above, this may correspond to adjusting the sizes of the transistors $T_3$ and $T_4$. The sizes of the transistors $T_3$ and $T_4$ can be adjusted by selectively enabling or disabling various of the individual transistors that make up the variable transistors $T_3$ and $T_4$.

Adjusting the size of a variable transistor may correspond to adjusting the width to length ratio of the transistor. If each of the transistors $M_1$-$M_5$ has a same length and they are connected in parallel, then enabling or disabling transistors subsets of the transistors $M_1$-$M_5$ does not effectively change the length of the channel of the variable transistor $T_3$. However, enabling or disabling $M_1$-$M_5$ does change the width of the channel of the variable transistor $T_3$. In particular, enabling additional of the transistors $M_1$-$M_5$ increases the width of the channel of the variable transistor $T_3$, thereby reducing the on-resistance of the variable transistor $T_3$. Disabling additional of the transistors $M_1$-$M_5$ decreases the width of the channel of the variable transistor $T_3$, thereby increasing the on-resistance of the variable transistor $T_3$.

As described previously, if the transistors $T_1$-$T_4$ do not turn on at the appropriate time due to reductions in the charging current I, this can result in increased amounts of heat generation and corresponding large changes in temperature. This is because currents will primarily flow through the diodes $D_1$-$D_4$ if the transistors $T_1$-$T_4$ do not turn on properly. This corresponds to operating the rectifier 104 in diode mode. Diodes typically have relatively large voltage drops and dissipate more power for a given amount of current than does the same amount of current flowing through MOSFETs.

In one example, the change in temperature $\Delta T$ in an electronic device based on current flowing through the rectifier in the synchronous operation can be approximated by the following relationship:

$$\Delta T = I^2 * 2R * \theta j,$$

where R is the on-resistance of the transistors, I is the current flowing through the transistors, and $\theta j$ is a package thermal resistance associated with the packaging of the rectifier 104. If the current is 0.4 amp and the on-resistance is 50 m, the voltage drop across the rectifier switch is 20 mV. The comparators 112 and 114 are able to operate correctly to maintain the on and off states of the rectifier switches. If θj is 47° C./W, then ΔT is about 0.8° C. in this mode.

In another example, the change in temperature ΔT in an electronic device based on current flowing through the rectifier in diode mode because the rectifier switch resistance is too low such that the comparators 112 and 114 cannot operate correctly (i.e. currents are flowing through the diodes $D_1$-$D_4$ rather than through the transistors $T_1$-$T_4$) can be approximated by the following relationship:

$$\Delta T = 2 * I * V * \theta j,$$

where V is the voltage drop across the diodes $D_1$-$D_4$. If the current I is 0.4 amp as in the previous case, the voltage drop across the diodes is 0.7 V, and θj is 47° C./W, then ΔT is about 26.3°. This corresponds to a relatively large change in temperature compared to operation in the synchronous mode.

Figure 5:
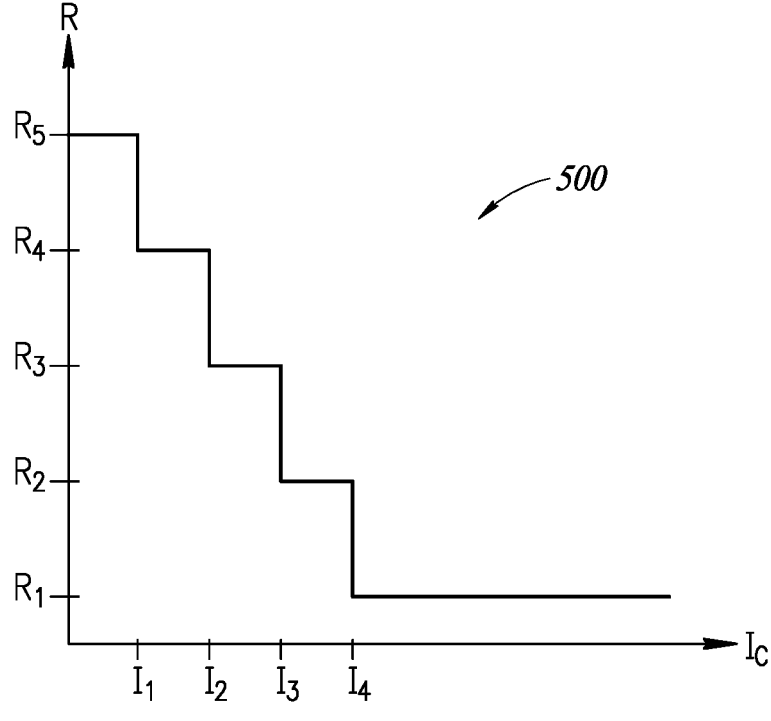
FIG. 5 includes a graph illustrating changes in the on-resistance of a variable switch of a synchronous rectifier based on a DC charging current.

FIG. 5 is a graph illustrating the changes in resistance for the variable transistor $T_3$ based on changes in the charging current I. The rectifier controller adjusts the on-resistance of the variable transistor $T_3$ responsive to the magnitude of the charging current I. When the charging current is less than the value $I_1$, the variable transistor $T_3$ has an on-resistance of $R_5$. When the charging current I has a value greater than or equal to $I_1$ and less than $I_2$, the on-resistance is $R_4$. When the charging current I has a value greater than or equal to $I_2$ and less than $I_3$, the on-resistance is $R_3$. When the charging current I has a value greater than or equal to $I_3$ and less than $I_4$, the on-resistance is $R_2$. When the charging current I has a value greater than or equal to $I_4$, the on-resistance is $R_1$.

In one example, $I_1$ is about 80 mA, $I_2$ is about 160 mA, $I_3$ is about 280 mA, and $I_4$ is about 400 mA. In one example, $R_1$ is about 0.05Ω, $R_2$ is about 0.1Ω, $R_3$ is about 0.25Ω, $R_4$ is about 1 ohm, and $R_5$ is about 5Ω. Other values for the charging current I and the on-resistance can be utilized without departing from the scope of the present disclosure.

Referring again to FIG. 2, in one embodiment, the level shifters 116 and 118 are not present. Instead, a third comparator is coupled to the gate terminal of the transistor $T_2$. In particular, the output of the third comparator is coupled to the gate terminal of the transistor $T_2$, the inverting input of the third comparator is coupled to $V_{AC1}$, and the noninverting input of the third comparator is coupled to ground. In this case, the transistor $T_2$ is a variable transistor substantially similar to the variable transistor $T_4$. A fourth comparator is coupled to the gate terminal of the transistor $T_1$. The output of the fourth comparator is coupled to the gate terminal of the transistor $T_1$, the inverting input of the fourth comparator is coupled to $V_{AC2}$, and the noninverting input of the fourth comparator is coupled to ground. In this case, the transistor $T_1$ is a variable transistor substantially similar to the variable transistor $T_3$.

FIG. 6 is a flow diagram of a method 600 for operating an integrated circuit, in accordance with one embodiment. The method 600 can utilize components, systems, and processes described in relation to FIGS. 1-5. At 602, the method 600 includes receiving an AC voltage at a rectifier. At 604, the method 600 includes rectifying the AC voltage with the rectifier. At 606, the method 600 includes outputting a DC current with the rectifier. At 608, the method 600 includes sensing a magnitude of the DC current. At 610, the method 600 includes adjusting a resistance of a switch of the rectifier based on the magnitude of the DC current.

FIG. 7 is a flow diagram of a method 700 for operating an integrated circuit, in accordance with one embodiment. The method 700 can utilize components, systems, and processes described in relation to FIGS. 1-7. At 702, the method 700 includes outputting a DC current with a rectifier. At 704, the method 700 includes sensing a magnitude of the DC current. At 706, the method 700 includes selectively enabling, responsive to the magnitude of the DC current, one or more of a plurality of parallel-coupled transistors of a switch of the rectifier.

In one embodiment, a device includes a synchronous rectifier including a first switch having a variable resistance, a current sensor coupled to an output of the rectifier, and a rectifier controller coupled to an output of the current sensor and to the variable switch.

In one embodiment, a device includes a rectifier. The rectifier includes a first switch, a first comparator having an output coupled to the first switch, a second switch, and a first level shifter coupled between the output of the first comparator and the second switch.

In one embodiment, a method includes receiving an AC voltage at a rectifier, rectifying the AC voltage with the rectifier, and outputting a DC current with the rectifier. The method includes sensing a magnitude of the DC current and adjusting a resistance of a switch of the rectifier based on the magnitude of the DC current.

In one embodiment, a method includes outputting a DC current with a rectifier, sensing a magnitude of the DC current, and selectively enabling, responsive to the magnitude of the DC current, one or more of a plurality of parallel-coupled transistors of a switch of the rectifier.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a rectifier including:
      a first input configured to receive a first AC voltage;
      a second input configured to receive a second AC voltage;
      an output configured to output a rectified voltage;
      a first switch coupled between the first input and ground and having a variable resistance;
      a first diode coupled in parallel with the first switch;
      a second switch coupled between the output of the rectifier and the second input;
      a second diode coupled in parallel with the second switch;
      a comparator having an output coupled to a control terminal of the first switch and configured to enable and disable the first switch; and
      a level shifter having an input coupled to the output of the comparator and the control terminal of the first switch and an output coupled to a control terminal of the second switch and configured to enable and disable the second switch;
   a current sensor coupled to the output of the rectifier; and
   a rectifier controller coupled to an output of the current sensor and to the first switch.

2. The device of claim 1, wherein the rectifier is configured to output a current, wherein the current sensor is configured to sense a magnitude of the current and to output a sensor signal indicative of the magnitude of the current, and the rectifier controller is configured to receive the sensor signal and to adjust a resistance of the first switch responsive to the sensor signal.

3. The device of claim 2, further comprising a battery configured to receive the current from the rectifier.

4. The device of claim 2, wherein the rectifier controller is configured to adjust the resistance of the first switch with an inverse relationship to the magnitude of the current.

5. The device of claim 2, wherein the first switch includes a plurality of parallel-coupled transistors.

6. The device of claim 5, wherein the rectifier controller adjusts the resistance of the first switch by selectively enabling subsets of the parallel-coupled transistors.

7. The device of claim 2, wherein, when the comparator outputs a low value, the level shifter passes the low value to the second switch, wherein, when the comparator outputs a high value, the level shifter outputs a boosted value higher than the high value to the second switch.

8. A device, comprising:

a rectifier, including:

a first input configured to receive a first AC voltage;

a second input configuration to receive a second AC voltage;

an output configured to output a rectified voltage;

a first switch coupled between the first AC voltage and ground;

a first comparator having an output coupled to a gate terminal of the first switch;

a second switch coupled between the output of the rectifier and the second input;

a third switch;

a first diode coupled in parallel with the first switch;

a second diode coupled in parallel with the second switch;

a third diode coupled in parallel with the third switch; and a first level shifter having an input coupled to the output of the comparator and to the gate terminal of the first switch, and a first level shifter output coupled to a gate terminal of the second switch.

9. The device of claim 8, wherein the rectifier includes:

a second comparator having an output coupled to the third switch;

a fourth switch; and a second level shifter coupled between the output of the second comparator and the fourth switch.

10. The device of claim 9, wherein the rectifier includes:

a fourth diode coupled in parallel with the fourth switch.

11. The device of claim 10, wherein:

the first input is coupled to a drain terminal of the first switch and to a first input of the first comparator;

the second input coupled to a drain terminal of the third switch and to a first input of the second comparator; and the output is coupled to source terminals of the second switch.

12. The device of claim 11, wherein the first and second comparators each include second inputs coupled to ground.

13. The device of claim 11, wherein the output of the rectifier outputs a DC current.

14. The device of claim 9, wherein the first switch includes a first plurality of parallel connected transistors, wherein the third switch includes a second plurality of parallel connected transistors.

15. The device of claim 14, further comprising:

a current sensor configured to sense a magnitude of a current output from the rectifier and to generate a sensor signal indicative of the magnitude of the current; and a rectifier controller configured to receive the sensor signal, to selectively enable at least one of the first plurality of transistors responsive to the sensor signal, and to selectively enable at least one of the second plurality of transistors responsive to the sensor signal.

16. The device of claim 8, further comprising:

a current sensor configured to sense a magnitude of a current output from the rectifier and to generate a sensor signal indicative of the magnitude of the current; and a rectifier controller configured to receive the sensor signal, to adjust a resistance of the first switch responsive to the sensor signal.

17. A method, comprising:

receiving a first AC voltage at a first input of a rectifier;

receiving a second AC voltage at a second input of the rectifier;

outputting a rectified voltage from an output of the rectifier based on the first AC voltage and the second AC voltage;

outputting a DC current with the output of the rectifier;

sensing a magnitude of the DC current;

adjusting a resistance of a first switch of the rectifier based on the magnitude of the DC current, the first switch being coupled between the first AC voltage and ground, a first diode being coupled in parallel with the first switch;

controlling a gate terminal of the first switch with a comparator having an output coupled to the gate terminal of the first switch;

controlling a second switch of the rectifier with a level shifter having an input coupled to the output of the comparator and to the gate terminal of the first switch, and a level shifter output coupled to a gate terminal of the second switch, the second switch being coupled between the output of the rectifier and the second input, a second diode being coupled in parallel with the second switch.

18. The method of claim 17, wherein adjusting the resistance of the first switch includes selectively enabling a subset of parallel-coupled transistors of the first switch.

19. The method of claim 17, further comprising generating the first and second AC voltages by inductively coupling an electronic device that includes the rectifier with a wireless charging device.

20. The method of claim 19, further comprising adjusting the magnitude of the DC current based on a state of charge of a battery.

21. The method of claim 20, further comprising charging a battery with the DC current.

22. A method, comprising:

receiving a first AC voltage at a first input of a rectifier;

receiving a second AC voltage at a second input of the rectifier;

outputting a DC current from an output of the rectifier;

sensing a magnitude of the DC current;

selectively enabling, responsive to the magnitude of the DC current, one or more of a plurality of parallel-coupled transistors of a first switch of the rectifier coupled between the first input and ground;

controlling a gate terminal of the first switch with a comparator having an output coupled to the gate terminal of the first switch, a first diode being coupled in parallel with the first switch; and controlling a second switch of the rectifier with a level shifter having an input coupled to the output of the comparator and to the gate terminal of the first switch, and an output coupled to a gate terminal of the second switch, the second switch being coupled between the output of the rectifier and the second input, a second diode being coupled in parallel with the second switch.

* * * * *